UNITED STATES PATENT OFFICE.

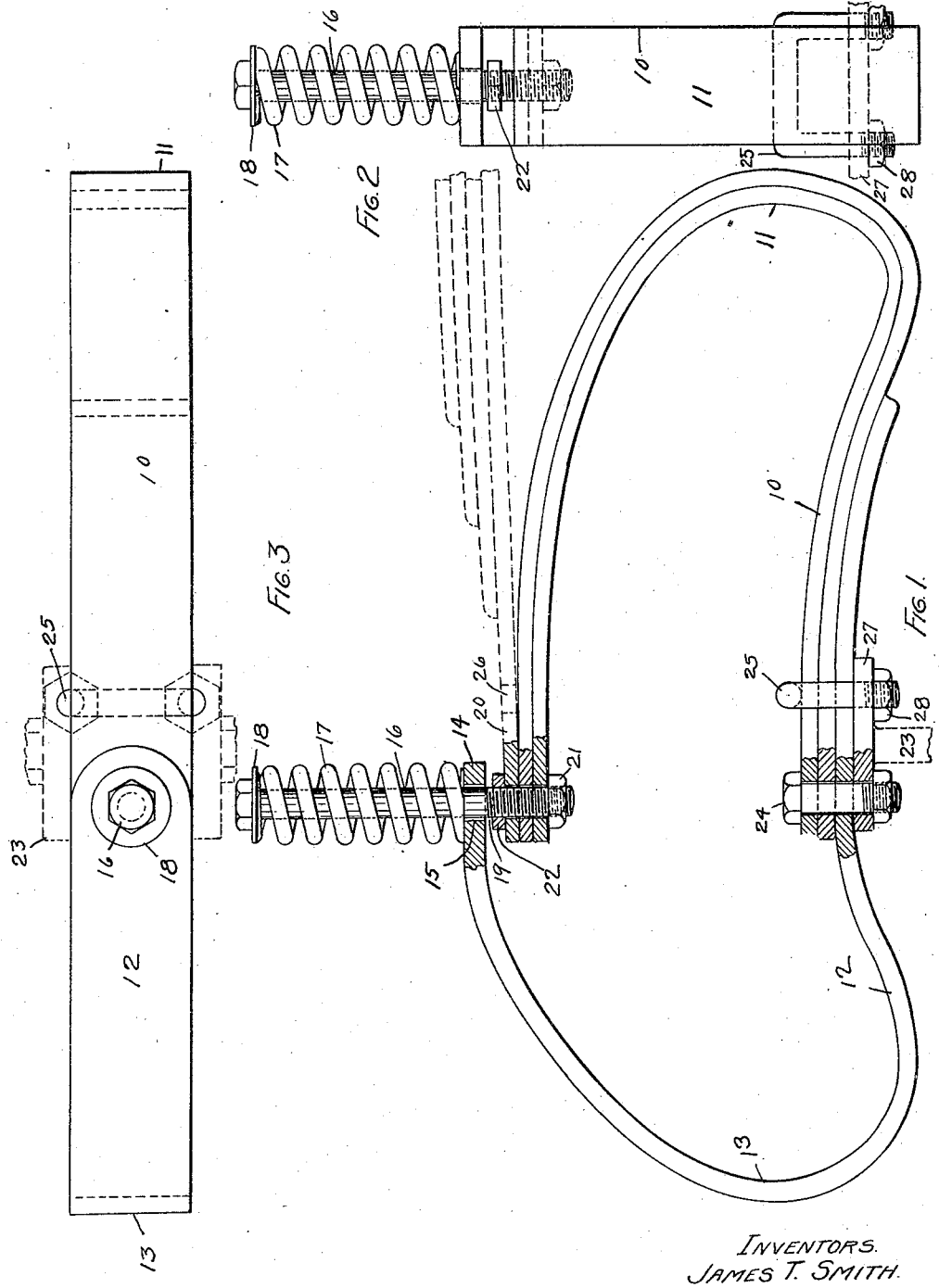

JAMES T. SMITH, SYLVESTER S. WILKINS, AND JOSEPH M. MANNING, OF PORTLAND, OREGON.

SHOCK ABSORBER.

1,418,484.  Specification of Letters Patent.  Patented June 6, 1922.

Application filed February 9, 1921. Serial No. 443,665.

*To all whom it may concern:*

Be it hereby known that we, JAMES T. SMITH, SYLVESTER S. WILKINS, and JOSEPH M. MANNING, citizens of the United States, and residents of Portland, in the county of Multnomah and State of Oregon, have invented a new and useful Shock Absorber, of which the following is a specification.

This invention relates more particularly to springs such as are used on motor vehicles.

The object of our invention is to provide an exceedingly simple and efficient shock absorber to be interposed between the usual springs of a car and the axles upon which they rest. A further object is to minimize the rebound and horizontal shocks encountered on rough roads, and at the same time provide a spring having its strength increased in direct proportion to its load.

We attain these results in the manner described in the following specification and illustrated in the accompanying drawing, in which:

Figure 1 is a side elevation showing one of these devices interposed between the spring and axis on a Chevrolet car. Figure 2 is a rear elevation of Fig. 1. Figure 3 is a plan of Fig. 1.

Similar numbers of reference refer to the same or similar parts throughout the several views.

Referring in detail to the drawing, we have constructed our device of a double U-shaped spring 10, in this case having its closed end 11 facing the rear of the car and resting upon a single flat spring 12 which is also U-shaped and having its closed end 13 toward the front of the car with its free end 14 having a large hole 15 which slidably carries the bolt 16 on which is placed a coil spring 17 and a washer 18. The threaded portion 19 of the bolt 16 passes downwardly through the leaf 20 of the car spring and a corresponding opening in the double spring 10 beneath which is a nut 21 and above which double spring and leaf is a nut 22. The double spring 10 and the single spring 12 are clamped to the axle member 23 by means of a bolt 24 which formerly held the leaf 20 to the axle 23. The U-shaped bolt 25 formerly engaged the notches 26 in the sides of the leaf 20 and now passes around the top and sides of the double spring 10 and the single spring 12 through the pad 27 on the axle 23, beneath which pad are placed the nuts 28. The sides of the double spring 10 and the single spring 12 are notched to correspond with the notch 26 in the leaf 20.

It will be observed that a slight space is left between the end 14 of the spring 12 and the nut 22 below same. This represents some of the compression of the spring 17 under a normal load. The other increase of which is taken up by the double spring 10 and the single spring 12 in succession. It will be noticed that the various springs come into play in successive and additional order thereby actually increasing the spring capacity of a vehicle directly in proportion with its load.

An important feature of this device consists in the fact that in the rebound the spring action is the same—that is, increased proportionately with the degree of rebound, which is not the case when the regular leaf spring is used in which the rebound is only counteracted by the lowermost leaf 20 of the spring.

While we have thus illustrated and described our invention it is not our intention to limit ourselves to these precise forms of springs, their method of attachment, or the order of succession in which they come into operation, but intend that they shall cover all forms and modifications of this device which fall fairly within the appended claims.

What we claim is:

1. In a shock absorber, the combination with a double U-shaped spring supporting a car, a single U-shaped spring whose upper end is positioned above the top of said double spring, a spiral spring above and acting upon said single spring, a bolt arranged within said spiral spring passing loosely through said single spring and clamping said double spring to the car spring.

2. In a shock absorber, the combination with the main spring of an automobile of a double flat U-shaped spring interposed between said main spring and secured to the axle, an upwardly projecting bolt securing the upper end of said double spring to the main spring, a single flat spring attached to said axle and terminating above in a free end which contains said upwardly projecting bolt loosely, and a spiral spring mounted upon said bolt under its head and above said single flat spring.

JAMES T. SMITH.
SYLVESTER S. WILKINS.
JOSEPH M. MANNING.